United States Patent Office 2,859,212
Patented Nov. 4, 1958

2,859,212

21-ALDO STEROIDS

Josef Fried, New Brunswick, N. J., assignor to Olin Mathieson Chemical Corporation, New York, N. Y., a corporation of Virginia No Drawing. Application November 12, 1954
Serial No. 468,575

15 Claims. (Cl. 260—239.55)

This invention relates to the synthesis of valuable steroids.

One of the objects of this invention is the provision of an advantageous process of preparing steroids of the 17-unsubstituted pregnane (including the pregnene and allopregnane) series having a 21-aldo or acetalized aldo group, a 9α-halo group, and an 11β-hydroxy or 11-keto group.

Another object of this invention is the provision of certain compounds useful either for their own physiological action or as intermediates in the preparation of physiologically-active derivatives.

The compounds of this invention comprise steroids of the pregnane (including the pregnene and allopregnane) series unsubstituted in the 17-position and having a 21-aldo or acetalized aldo substituent, a 9α-halo substituent, and an 11β-hydroxy or 11-keto substituent. These new steroids are prepared by the process of this invention, which essentially comprises converting a 9α-halo, 11β-hydroxy or 11-keto, 17α-hydroxy, 21-hydroxy or acyloxy steroid of the pregnane (including the pregnene and allopregnane) series to the corresponding 9α-halo, 11β-hydroxy or 11-keto, 17-unsubstituted, 21-acetalized aldo derivative, by treatment of the former with an alcohol under anhydrous acidic conditions. The 21-acetal derivative thus formed may then be converted to the corresponding free 21-aldehyde by treatment of the acetal with a mineral acid in an aqueous organic solvent in which the acetal is soluble (e. g. acetic acid or dioxane and water).

Among the compounds of this invention which have an acetalized 21-aldo group are those of the general formula:

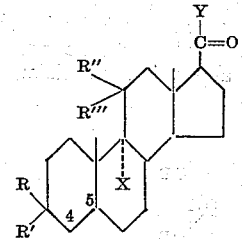

wherein the 4,5 position is double-bonded or saturated (preferably double-bonded), and wherein R is hydrogen, R′ is hydroxy or together R and R′ is a keto or acetalized keto group (preferably the free keto group), R″ is hydrogen, R‴ is β-hydroxy, or together R″ and R‴ is a keto group, X is an α-halogen group and Y is either of the acetalized aldo groups

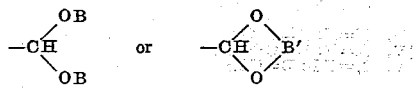

wherein B is a saturated aliphatic radical, such as an alkyl (e. g. a lower alkyl, such as methyl, ethyl, propyl, n-butyl or amyl), a haloalkyl (e. g. a halo-substituted lower alkyl such as chloromethyl, 2-fluoroethyl, 2-bromopropyl, or 1,2-dichloroethyl), or an alkoxyalkyl (e. g. a lower alkoxyalkyl, such as ethoxymethyl, methoxyethyl, or ethoxyethyl); or B is an aralkyl radical such as a phenylalkyl (e. g. benzyl, phenethyl, tolylethyl, p-chlorobenzyl, or anisylmethyl), or a naphthylalkyl (e. g. naphthylmethyl); and B′ is a saturated aliphatic divalent radical such as an alkylene (e. g. a lower alkylene, such as ethylene, propylene, 2-methylpropylene, or butylene), a haloalkylene (e. g. a halo-substituted lower alkylene, such as chlorethylene, fluoropropylene, or 1-chloro-2-ethylpropylene), or an alkoxyalkylene (e. g. a lower alkoxy-lower-alkylene, such as ethoxyethylene, 2-methoxypropylene, or methoxyethylene).

Representative acetalized 21-aldo steroids of this invention include the acetals (both straight chain and cyclic) of:

9α-fluoro-Δ⁴-pregnene-11β-ol-3,20-dione-21-al [e. g. 9α-fluoro-Δ⁴-pregnene-11β-ol-3,20-dione-21-al dimethyl acetal, the corresponding 21-diethyl acetal, the corresponding 21-di-n-propyl acetal, the corresponding 21-di-n-butyl acetal, the corresponding 21-dibenzyl acetal, and the corresponding 21-alkylene (i. e. ethylene) cyclic acetal]-;

9α-chloro-Δ⁴-pregnene-11β-ol-3,20-dione-21-al [e. g. 9α-chloro-Δ⁴-pregnene-11β-ol-3,20-dione - 21 - al dimethyl acetal, the corresponding 21-diethyl acetal, the corresponding 21-di-n-propyl acetal, the corresponding 21-di-n-butyl acetal, the corresponding 21-dibenzyl acetal, and the corresponding 21-ethylene cyclic acetal];

9α-bromo-Δ⁴-pregnene-11β-ol-3,20-dione - 21 - al [e. g. 9α-bromo-Δ⁴-pregnene-11β-ol-3,20-dione - 21 - al dimethyl acetal, as well as the 21-diethyl, 21-di-n-propyl, 21-di-n-butyl, 21-dibenzyl, and 21-ethylene acetal derivatives];

9α-iodo-Δ⁴-pregnene-11β-ol-3,20-dione-21-al [e. g. 9α-iodo-Δ⁴-pregnene-11β-ol-3,20-dione-21-al dimethyl acetal];

9α-fluoro-Δ⁴-pregnene-3,11,20-trione-21-al [e. g. 9α-fluoro-Δ⁴-pregnene-3,11,20-trione-21-al dimethyl acetal, the corresponding 21-diethyl acetal, the corresponding 21-di-n-propyl acetal, the corresponding 21-di-n-butyl acetal, the corresponding 21-dibenzyl acetal, and the corresponding 21-alkylene (i. e. ethylene) cyclic acetal];

9α-chloro-Δ⁴-pregnene-3,11,20-trione-21-al [e. g. 9α-chloro-Δ⁴-pregnene-3,11,20-trione-21-al dimethyl acetal, the corresponding 21-diethyl acetal, the corresponding 21-di-n-propyl acetal, the corresponding 21-di-n-butyl acetal, the corresponding 21-dibenzyl acetal and the corresponding 21-ethylene acetal];

9α-bromo-Δ⁴-pregnene-3,11,20-trione-21-al [e. g. 9α-bromo-Δ⁴-pregnene-3,11,20-trione-21-al dimethyl acetal, and its 21-diethyl, 21-di-n-propyl, 21-di-n-butyl, 21-dibenzyl and 21-ethylene derivatives]; and 9α-iodo-Δ⁴-pregnene-3,11,20-trione-21-al [e. g. 9α-iodo-Δ⁴-pregnene-3,11,20-trione-21-al-dimethyl acetal].

Among the compounds of this invention which have a 21-aldo group are those of the general formula:

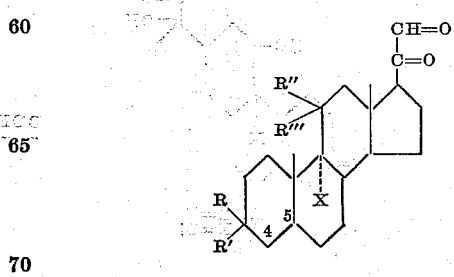

wherein the 4,5 position is double bonded or saturated (preferably double-bonded), and wherein R, R', R", R''', and X are as above-defined. Since in the presence of a hydroxy-containing solvent (e. g. water), the 21-aldo group readily adds a mole of the solvent and, therefore, exists as a hydrate (or equivalent), the terms 21-aldo and 21-aldehyde are hereby defined as including such derivatives as the hydrate, but not the acetal derivatives, which are referred to as acetalized aldo or aldehydes.

Representative 21-aldo steroids of this invention include: 9α-fluoro-Δ⁴-pregnene-11β-ol-3,20-dione-21-al; 9α-chloro-Δ⁴-pregnene-11β-ol-3,20-dione-21-al; 9α-bromo-Δ⁴-pregnene-11β-ol-3,20-dione-21-al; 9α-iodo-Δ⁴-pregnene-11β-ol-3,20-dione-21-al; 9α-fluoro-Δ⁴-pregnene-3,11,20-trione-21-al; 9α-chloro-Δ⁴-pregnene-3,11,20-trione-21-al; 9α-bromo-Δ⁴-pregnene-3,11,20-trione-21-al; and 9α-iodo-Δ⁴-pregnene-3,11,20-trione-21-al.

Among the compounds which are useful as starting materials in the practice of this invention are those of the general formula

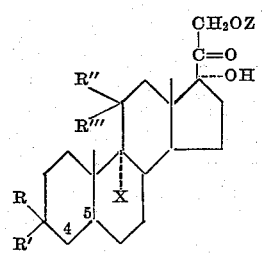

wherein the 4,5 position is double-bonded or saturated (preferably double-bonded), and wherein R, R', R", R''', and X are as above-defined, and Z is hydrogen or an acyl radical, such as: an aliphatic acyl radical, as exemplified by an alkanoyl radical (e. g. lower alkanoyl, such as acetyl, propionyl, or butyryl), a halo-substituted alkanoyl, a nitro-substituted alkanoyl, an alkoxy-substituted alkanoyl, or an amino-substitued alkanoyl; an aralkanoyl, such as a phenyl-alkanoyl radical (e. g. phenylacetyl); or an aroyl, such as a phenyl carbonyl (e. g. benzoyl, toluyl, or cumoyl). The preferred compounds of this group are those wherein the 4,5 position is double-bonded, R and R' together represent oxo, R" is hydrogen, R''' is β-hydroxy, or together R" and R''' is oxo, and Z is hydrogen or lower alkanoyl (e. g., acetyl).

Representative of the compounds utilizable in the process of this invention are: the 9α-halohydrocortisones and the esters (preferably lower alkanoic acid esters) thereof, e. g. 9α-fluorohydrocortisone, 9α-fluorohydrocortisone acetate, 9α-chlorohydrocortisone, 9α-chloro-hydrocortisone acetate, 9α-bromohydrocortisone, 9α-bromohydrocortisone acetate, 9α-iodohydrocortisone, and 9α-iodohydrocortisone acetate, and the 9α-halocortisones and the esters (preferably lower alkanoic acid esters) thereof, e. g. 9α-fluorocortisone, 9α-fluorocortisone acetate, 9α-chloro-cortisone, 9α-chlorocortisone acetate, 9α-bromo-cortisone, 9α-bromocortisone acetate, 9α-iodocortisone, and 9α-iodocortisone acetate.

According to the process of this invention, these starting materials are reacted under anhydrous conditions in an acidic medium with either a monohydric alcohol of the formula BOH or a dihydric alcohol of the formula B'(OH)₂, wherein B and B' are as above-defined, preferably with an alcohol of the formula BOH, wherein B is a lower alkyl (e. g., methyl, ethyl, n-propyl, or n-butyl) or benzyl radical. The reaction is preferably carried out by dissolving the starting material in an anhydrous organic solvent, such as chloroform, and treating the solution with a mineral acid such as hydrogen chloride or a strong organic acid, such as trichloro acetic acid or p-toluene sulfonic acid, either before or after the addition of the alcohol reactant. The ratio of alcohol to steroid for the reaction is preferably at least two equivalents of alcohol (i. e. two moles of an alcohol BOH or one mole of an alcohol B'(OH)₂) per mole of steroid. The reaction proceeds readily at room temperature, but may be conducted at any temperature in the range of 25° C. to 100° C.

The acetal derivative formed by the first step of the process of this invention may then be converted to the corresponding free aldehyde by reacting the acetal with an aqueous mineral acid, such as hydrochloric acid or perchloric acid, in mixture with an organic solvent, such as acetic acid, dioxane, acetone, etc., preferably at room temperature.

A modification of the process of this invention consists of the direct oxidation of an acetal derivative of a 21-aldo steroid having an 11β-hydroxy group to the corresponding acetal derivative having an 11-keto group. Thus, to form a 21-aldo steroid having an 11-keto group, instead of starting with the corresponding steroid having an 11-keto group and converting this 11-keto steroid to acetal derivative and thence to the free aldehyde, the 11β-hydroxy derivative (R" is hydrogen, R''' is β-hydroxy) is chosen as the initial reactant, and this reactant is converted to the 21-acetal derivative. The acetal derivative is then reacted with a customary oxidizing agent, such as chromic oxide in an acidic medium, to oxidize the 11β-hydroxy group to keto, and the 11-keto 21-acetal derivative thus formed is then converted to the free 21-aldehyde.

For the purpose of illustrating one process of this invention, reference is made to the following schematic analysis employing 9α-halo-hydrocortisone acetate and 9α-halocortisone acetate as starting materials:

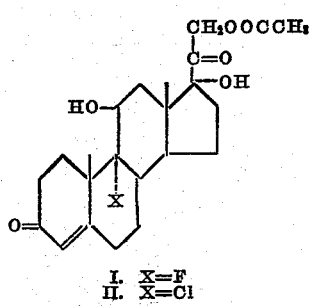

I. X=F
II. X=Cl

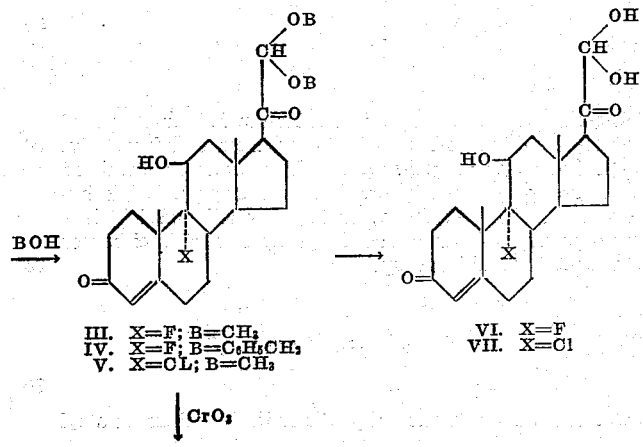

III. X=F; B=CH₃
IV. X=F; B=C₆H₅CH₂
V. X=Cl; B=CH₃

VI. X=F
VII. X=Cl

↓ CrO₃

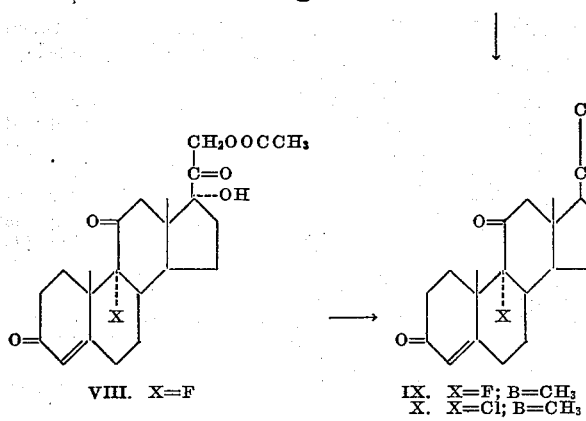
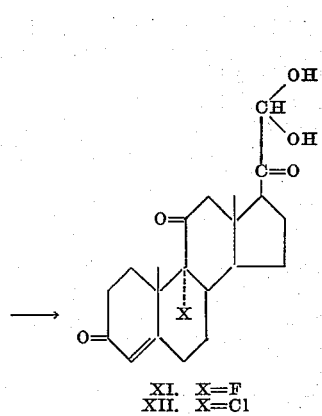

VIII. X=F  
IX. X=F; B=CH₃  
X. X=Cl; B=CH₃  
XI. X=F  
XII. X=Cl

Both the acetal derivatives and free aldehydes of this invention are active materials which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, and desoxycorticosterone in the treatment of Addison's disease or adrenal insufficiencies. The dosage for such administration is of course dependent on the relative activity; thus, where the acetal derivative, for example, has activity of the same order as hydrocortisone, for example, the dosage is of the same order.

The following examples are illustrative of the invention (all temperatures being in centigrade):

EXAMPLE 1

*9α - fluoro -Δ⁴- pregnene-11β-ol-3,20-dione 21-al-dimethyl acetal (III) from 9α-fluorohydrocortisone acetate (I)*

A solution of 505 mg. of 9α-fluorohydrocortisone acetate in 13 ml. of chloroform, 32 ml. of anhydrous methanol and 7 ml. of 1.5 N anhydrous methanolic hydrogen chloride is allowed to stand at room temperature for 64 hours. Sodium bicarbonate solution is then added until the mixture is basic and after addition of 25 ml. of chloroform the layers are separated. The aqueous layer is extracted again with chloroform and the combined chloroform extracts washed with water. After drying with sodium sulfate the chloroform is removed in vacuo and the residue crystallized from ethyl acetate. After an additional recrystallization from ethyl acetate the pure compound melts at about 174–175°; $[\alpha]_D^{23}$ +184° (c., 0.7 in CHCl₃);

$\lambda_{max}^{alc.}$ 283 mμ (ε=14,600); $\lambda_{max}^{Nujol}$ 2.91μ (OH), 5.80μ, (20-keto), 5.97μ, 6.16μ (Δ⁴-3 ketone)

*Analysis.*—Calcd. for $C_{23}H_{33}O_5F$: C, 67.26; H, 8.14; OCH₃, 15.20. Found: C, 67.56; H, 8.00; OCH₃, 14.53.

9α-fluoro-Δ⁴-pregnene-11β-ol-3,20-dione 21-al-dimethyl acetal is as active as cortisone acetate in the rat liver glycogen assay and about equal to desoxycorticosterone in maintaining the life of adrenalectomized rats and in retaining sodium.

By substituting 32 ml. of anhydrous ethanol for the methanol and 7 ml. of 1.5 N anhydrous ethanolic hydrogen chloride for the methanolic hydrogen chloride in Example 1, 9α-fluoro-Δ⁴-pregnene-11β-ol-3,20-dione-21-al-diethyl acetal is produced. Similarly, by substituting other alkanols for methanol in Example 1, the corresponding 21-dialkyl acetal derivatives are formed. Thus, n-propanol yields 9α - fluoro - Δ⁴ - pregnene - 11β-ol-3,20-dione-21-al-di-n-propyl acetal and n-butanol yields 9α-fluoro-Δ⁴-pregnene-11β-ol-3,20-dione-21-al-di-n-butyl acetal, while ethylene glycol yields 9α-fluoro-Δ⁴-androstene-11β-ol-3,20-dione-21-al-ethylene acetal.

EXAMPLE 2

*9α - fluoro - Δ⁴-pregnene-11β-ol-3,20-dione 21-al-dibenzyl acetal (IV) from 9α-fluorohydrocortisone acetate (I)*

A solution of 500 mg. of 9α-fluorohydrocortisone acetate in 25 ml. of 0.46 N hydrogen chloride in chloroform and 5 ml. of benzyl alcohol is allowed to remain at room temperature for 64 hours with the exclusion of moisture. The resulting mixture is worked-up as described in Example 1 furnishing 9α-fluoro-Δ⁴-pregnene-11β-ol-3,20-dione 21-al-dibenzyl acetal.

EXAMPLE 3

*9α - fluoro - Δ⁴ - pregnene-11β-ol-3,20-dione 21-al-hydrate (VI) from 9α-fluoro-Δ⁴-pregnene-11β-ol-3,20-dione-21-al-dimethyl acetal (III)*

A solution of 100 mg. of 9β-fluoro-Δ⁴-pregnene-11β-ol-3,20-dione 21-al-dimethyl acetal in 2 ml. of glacial acetic acid and 2 ml. of 2 N aqueous hydrochloric acid is allowed to stand at room temperature for 4 days. An aqueous solution of 400 mg. of sodium bicarbonate is added and the mixture extracted with chloroform. The chloroform solution is in turn extracted with bicarbonate solution and with water and dried over sodium sulfate. Evaporation of the chloroform extract in vacuo leaves a residue consisting of 9α-fluoro-Δ⁴-pregnene-11β-ol-3,20-dione 21-al-hydrate.

The biological activity of this compound is approximately equal to that of the dimethyl acetal.

In a similar manner by substituting one of the following: 9α-fluoro-Δ⁴-pregnene-11β-ol-3,20-dione-21-al-diethyl acetal; 9α-fluoro-Δ⁴-pregnene-11β-ol-3,20-dione 21-al-di-n-propyl acetal; 9α-fluoro-Δ⁴-pregnene-11β-ol-3,20-dione-21-al-di-n-butyl acetal; or 9α-fluoro-Δ⁴-pregnene-11β-ol-3,20-dione-21-al-dibenzyl acetal for the 21-al-dimethyl acetal of Example 3, 9α-fluoro-Δ⁴-pregnene-11β-ol-3,20-dione 21-al-hydrate is produced.

EXAMPLE 4

*9α-fluoro-Δ⁴-pregnene-3,11,20-trione 21-al-dimethyl acetal (IX) from 9α-fluoro-Δ⁴-pregnene-11β-ol-3,20-dione 21-al-dimethyl acetal (III)*

To a solution of 100 mg. of 9α-fluoro-Δ⁴-pregnene-11β-ol-3,20-dione 21-al-dimethyl acetal in 4 ml. of glacial acetic acid is added a solution of 25 mg. of CrO₃ in 2.5 ml. glacial acetic acid. After 20 minutes 1 ml. of alcohol is added and the mixture concentrated to a sirup. Water and chlorfrom are added and after separation of the layers, the chloroform phase is extracted with water, bicarbonate solution, and again with water. The chloroform extract is dried over sodium sulfate and evaporated to dryness in vacuo. The residue represents 9α-fluoro-Δ⁴-pregnene-3,11,20-trione 21-al-dimethyl acetal. Its biological activity is approximately equal to that of the corresponding 11β-hydroxy compound.

9α-fluoro-Δ⁴-pregnene-3,11,20-trione 21 - al - dimethy acetal can also be prepared directly from 9α-fluorocortisone acetate (VIII) by substituting 9α-fluorocortisone acetate for 9α-fluorohydrocortisone acetate in the process of Example 1. Similarly other 9α-fluoro-Δ⁴-pregnene-11β-ol-3,20-dione 21-al-acetals such as the 21-diethyl acetal, the 21-di-n-butyl acetal, the 21-di-n-propyl acetal, the 21-dibenzyl acetal and the 21-ethylene acetal can be oxidized to the corresponding 11-keto 21-acetal derivatives by the process of Example 4.

The 9α-fluoro, 21-acetals, e. g., 9α-fluoro-Δ⁴-pregnene-3,11,20-trione 21-al-dimethyl acetal (IX), can then be converted to the corresponding 9α-fluoro-21-aldehyde hydrates, e. g. 9α-fluoro-Δ⁴-pregnene-3,11,20-trione 21-al-hydrate (XI), by the method of Example 3.

EXAMPLE 5

*9α-chloro-Δ⁴-pregnene-11β-ol-3,20-dione 21-al-dimethyl acetal (V) from 9α-chlorohydrocortisone acetate (II)*

A solution of 1 g. of 9α-chlorohydrocortisone acetate in 26 ml. of chloroform, 64 ml. of anhydrous methanol and 14 ml. of 1.5 N methanolic hydrogen chloride is allowed to stand at room temperature for 64 hours. The mixture is worked up as described in Example 1 for the corresponding fluoro compond. Evaporation of the chloroform extract in vacuo furnishes a residue (about 1.06 g.) which crystallizes readily from methanol. About 730 mg. of crystalline product of M. P. about 106–109° is obtained. This material contains 1 mole of methanol of crystallization. The anhydrous compound is obtained by recrystallization from ethyl acetate-hexane, M. P. about 138°; $[\alpha]_D^{23}$ +191° (c., 0.93 in chloroform);

$\lambda_{max}^{alc.}$ 240 m$\mu$ ($\epsilon$=17,800); $\lambda_{max}^{Nujol}$ 2.90$\mu$ (OH), 5.80$\mu$, 5.86$\mu$ (20-keto), 6.02$\mu$ (3-keto)

*Analysis.*—Calcd. for $C_{23}H_{33}O_5Cl$: C, 65.00; H, 7.82; Cl, 8.34; OCH$_3$, 14.59. Found: C, 65.29; H, 7.73; Cl, 8.46; OCH$_3$, 14.79.

9α-chloro-Δ⁴-pregnene-11β-ol - 3,20 - dione 21 - al - dimethyl acetal is about ⅓ as active as cortisone acetate in the rat liver gycogen assay, and about twice as active as desoxycorticosterone in sodium retention in the adrenalectomized rat.

By substituting other alcohols such as ethanol, n-propanol, n-butanol, benzyl alcohol, and ethylene glycol for the methanol in Example 5, the corresponding 21-diethyl acetal, 21-di-n-propyl acetal, 21-di-n-butyl acetal, 21-dibenzyl acetal, and ethylene acetal derivatives of 9α-chloro-Δ⁴-pregnene-11β-ol-3,20-dione 21-al are obtained.

EXAMPLE 6

*9α-chloro-Δ⁴-pregnene-11β-ol-3,20-dione - 21 - al hydrate (VII) from 9α-chloro-Δ⁴-pregnene-11β-ol-3,20-dione 21-al-dimethyl acetal (V)*

A solution of 100 mg. of 9α-chloro-Δ⁴-pregnene-11β-ol-3,20-dione 21-al-dimethyl acetal in 2 ml. of glacial acetic acid and 2 ml. of 2 N aqueous hydrochloric acid is allowed to stand at room temperature for 4 days. An aqueous solution of 400 mg. of sodium bicarbonate is added and the mixture is extracted with chloroform. The chloroform solution is in turn extracted with bicarbonate solution and with water and dried over sodium sulfate. Evaporation of the chloroform extract in vacuo leaves a residue consisting of 9α-chloro-Δ⁴-pregnene-11β-ol-3,20-dione 21-al-hydrate.

Similarly the corresponding 21-diethyl acetal, 21-di-n-propyl-acetal, 21-di-n-butyl acetal, 21-dibenzyl acetal and 21-ethylene acetal derivatives can be converted to the 21-aldehyde hydrate by the method of Example 6.

The 21-dimethyl acetal (V) of Example 5, as well as its diethyl, di-n-propyl, di-n-butyl, dibenzyl and ethylene analogues, can be converted to the corresponding 11-keto derivative e. g., 9α-chloro-Δ⁴-pregnene-3,11,20-trione 21-al-dimethyl acetal (X), by the method of Example 4, which in turn can be converted to 9α-chloro-Δ⁴-pregnene-3,11,20-trione 21-al-hydrate (XII) by the method of Example 3.

If 9α-bromo hydrocortisone acetate, 9α-iodo hydrocortisone acetate, 9α-bromo cortisone, or 9α-iodo cortisone is substituted for the fluoro or chloro derivatives in Examples 1–6, the corresponding bromo and iodo steroids are formed.

Aside from their own physiological activity and their use as intermediates in preparing the free 21-aldehydes of this invention, the 21-dibenzyl acetal derivatives, such as the 21-dibenzyl acetal derivatives of 9α-fluoro-Δ⁴-pregnene-11β-ol-3,20-dione-21-al (IV) and of 9α-chloro-Δ⁴-pregnene-11β-ol-3,20-dione-21-al, also are useful as intermediates in the conversion of 9α-halohydrocortisone to 9α-halocorticosterone. Thus, as detailed in the following example, using 9α-fluoro-Δ⁴-pregnene-11β-ol-3,20-dione-21-al-21-dibenzyl acetal, the 9α-halo-Δ⁴-pregnene-11β-ol-3,20-dione 21-al-dibenzyl acetals, produced from 9α-halohydrocortisone (or an ester thereof) by the method of Example 2, are catalytically reduced by means of a palladium catalyst to the corresponding 9α-halo-corticosterone.

EXAMPLE 7

*9α-fluorocorticosterone acetate from 9α-fluoro-Δ⁴-pregnene-11β-ol-3,20-dione-21-al-dibenzyl acetal (IV)*

A mixture of 1 g. of 9α-fluoro-Δ⁴-pregnene-11β-ol-3,20-dione-21-al-dibenzyl acetal, 50 mg. of p-toluenesulfonic acid and 20 ml. of 2-methyl-2-ethyldioxolane is heated and the liberated butanone together with the reactant dioxolane distilled slowly through a small Claisen-Vigreux column at atmospheric pressure for a period of 5 hours (ca. 8 ml. of distillate). The cooled reaction mixture is diluted with benzene and the resulting solution extracted with dilute sodium bicarbonate and water. The benzene solution is dried over sodium sulfate and the solvents removed in vacuo. The residual 3-dioxolane of 9α-fluoro-Δ⁴-pregnene-11β-ol-3,20-dione-21-al-dibenzyl-acetal is crystallized from acetone-hexane and dissolved in 50 ml. of ethyl acetate for the subsequent reduction. To the resulting solution is added 200 mg. of 5% palladium on charcoal and the suspension shaken in the presence of hydrogen until the absorption of hydrogen comes to a standstill. The solution is filtered and the solvent evaporated in vacuo. The resultant residue is treated with 10 ml. of 80% acetic acid at 100° for 30 minutes to hydrolyze the 3-dioxolane grouping. The hydrolysis solution is concentrated to small volume in vacuo, extracted with chloroform and the chloroform solution washed with bicarbonate and with water. The chloroform extract is dried over sodium sulfate and evaporated to dryness in vacuo. The resulting 9α-fluorocorticosterone is acetylated with 2 ml. of pyridine and 2 ml. of acetic anhydride for 12 hours and the acetylating agents removed in high vacuum. The resulting residue is crystallized from ethyl acetate and after several recrystallizations from the same solvent affords pure 9α-fluorocorticosterone acetate, M. P. 212–213°;

$[\alpha]_D^{23}$ −187° (ChCl$_3$)

Although the 9α-bromo and 9α-iodo 21-aldo steroids of this invention, can be prepared by the methods of Examples 1 through 6, in some instances it may be preferable to form these halide derivatives indirectly from the corresponding 9α-chloro 21-acetal derivatives by way of the 9β,11β-oxido intermediates. Thus, the 9α-chloro 21-acetal derivatives are reacted with a salt of a strong base and a weak acid, such as an alkali metal carbonate or bicarbonate (i. e. potassium bicarbonate) or an alkali metal lower alkanoate (i. e. potassium acetate), and the 9β,11β-oxido compound, thus formed, is then reacted with a hydrogen halide (e. g. hydrofluoric acid, hydrochloride acid, hydrobromic acid or hydroiodic acid) to form the 9α-halo 11β-hydroxy 21-aldo acetal derivative. This series of steps can be represented by the following schematic analysis and examples:

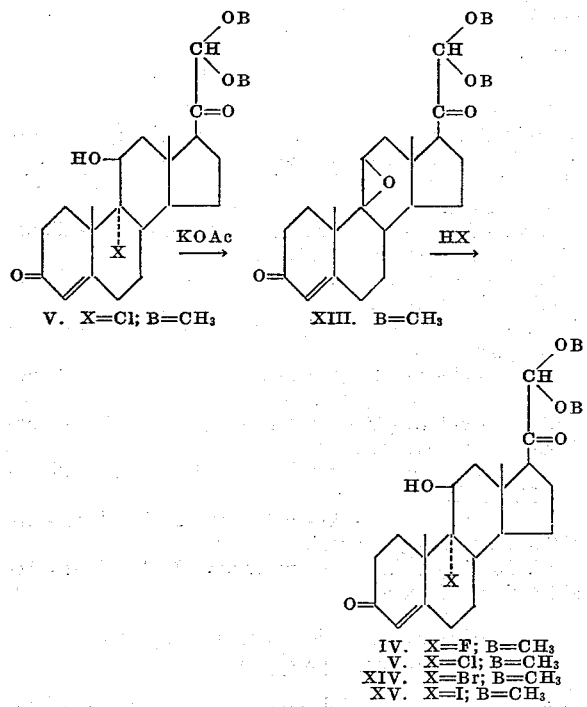

EXAMPLE 8

9β,11β-oxido-Δ⁴-pregnene-3,20-dione 21-al-dimethyl acetal (XIII) from 9α-chloro-Δ⁴-pregnene-11β-ol-3,20-dione 21-al-dimethyl acetal (V)

To a solution of 130 mg. of 9α-chloro-Δ⁴-pregnene-11β-ol-3,20-dione 21-al-dimethyl acetal in 10 ml. of methanol is added a solution of 105 mg. of potassium carbonate in 0.5 ml. of water. The resulting suspension is placed into a mechanical shaker at room temperature for 3 hours, after which time 4 ml. of water is added, and the solution is freed from methanol in vacuo. Chloroform is added to the residue, and after mixing and separation of the layers, the chloroform solution is washed with water and dried over sodium sulfate. Evaporation of the solvent leaves a residue of 9β,11β-oxido-Δ⁴-pregnene-3,20-dione 21-al-di-methyl acetal.

The structure of the 9β,11β-oxido-Δ⁴-pregnene-3,20-dione-21-al-dimethyl acetal is proven by converting it back to 9α-chloro-Δ⁴-pregnene-3,20-dione-21-al-dimethyl acetal, as detailed in the following example:

EXAMPLE 9

9α - chloro - Δ⁴ - pregnene - 3,20 - dione - 21 - al - dimethyl acetal (V) from 9β,11β - oxido - Δ⁴ - pregnene-3,20-dione-21-al-dimethyl acetal (XIII)

To a solution of 100 mg. of 9β,11β-oxido-Δ⁴-pregnene-3,20-dione-21-al-dimethyl acetal in 10 ml. of chloroform is added at 0° C., 1.5 ml. of 0.5 N hydrochloric acid in chloroform. After 30 minutes, ice and dilute bicarbonate are added to wash out excess acid; and after separation of the layers, the chloroform solution is washed with water, dried over sodium sulfate and evaporated to dryness in vacuo. The residue is crystallized from methanol to give a crystalline product containing one mole of methanol of crystallization. The anhydrous compound is obtained by recrystallization from ethyl acetate-hexane, and is identical with the compound formed in Example 5, as proven by mixed melting point and optical rotation data.

EXAMPLE 10

9α - bromo - Δ⁴ - pregnene - 3,20 - dione 21 - al - dimethyl acetal (XIV) from 9β,11β-oxido-Δ⁴-pregnene-3,20-dione 21-al-dimethyl acetal (XIII)

To a solution of 25 mg. of 9β,11β-oxido-Δ⁴-pregnene-3,20-dione 21-al-dimethyl acetal in 1 ml. of chloroform is added with shaking at room temperature 0.04 ml. 30% hydrobromic acid in glacial acetic acid. After 10 minutes, 10 ml. of chloroform is added, and the mixture is extracted with dilute sodium bicarbonate and with water. The chloroform solution is dried over sodium sulfate, and evaporated to dryness in vacuo; and the residue, representing 9α-bromo-Δ⁴-pregnene-3,20-dione 21-al-dimethyl acetal, is crystallized from acetone.

In a similar manner, by substituting 60% aqueous hydroiodic acid for hydrobromic acid in Example 10, the corresponding 9α-iodo compound (XV) is formed.

The 9α-bromo or 9α-iodo 21-acetal derivatives can be converted to the corresponding 21-aldehyde by the method of Example 3, or can be oxidized to the 9α-bromo or 9α-iodo 11-keto 21-acetal derivative by the method of Example 4.

These 9α-bromo and 9α-iodo 21-aldo steroids, aside from their activity as glucocorticoids and mineralocorticoids, have an added utility as intermediates in the preparation of the known 9α-dehalo analogues. Thus, the 9α-bromo and 9α-iodo steroids may be reduced by treatment with usual reducing agents, such as zinc in glacial acetic acid, to remove the 9α-halo radical and form the 9-unsubstituted derivatives.

The invention may be variously otherwise embodied within the scope of the appended claims.

I claim:

1. A steroid selected from the group consisting of those of the formula

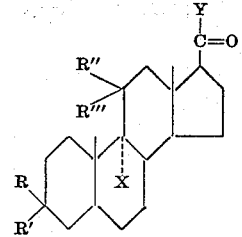

and

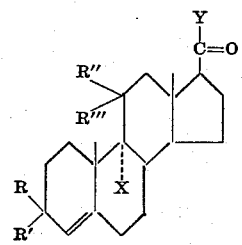

wherein individually R is hydrogen, R' is hydroxy and together R and R' is keto, individually R" is hydrogen, R''' is β-hydroxy and together R" and R''' is keto; X is an α- halogen group; and Y is selected from the class consisting of

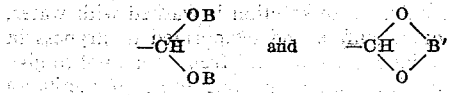

wherein B is a radical of the class consisting of lower alkyl, halo-substituted lower alkyl, lower alkoxyalkyl, and phenyl (lower alkyl) and B' is a saturated divalent aliphatic radical.

2. $9\alpha$ - halo - $\Delta^4$ - pregnene - $11\beta$ - ol - 3,20 - dione-21-al 21-di(lower alkyl)acetal.

3. $9\alpha$ - halo - $\Delta^4$ - pregnene - 3,11,20 - trione - 21 - al 21-di(lower alkyl)acetal.

4. A steroid selected from the class consisting of those of the formula

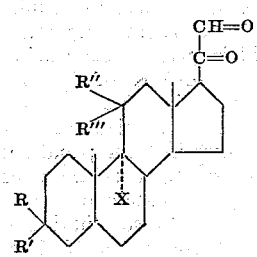

and

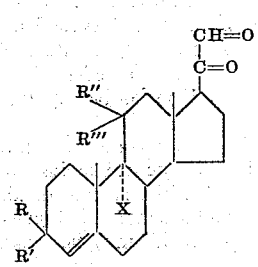

wherein individually R is hydrogen, R' is hydroxy and together R and R' is keto; individually R'' is hydrogen, R''' is $\beta$-hydroxy and together R'' and R''' is keto; X is an $\alpha$-halogen group; and the hydrates thereof.

5. $9\alpha$ - halo - $\Delta^4$ - pregnene - $11\beta$ - ol - 3,20 - dione-21-al hydrate.

6. $9\alpha$ - halo - $\Delta^4$ - pregnene - 3,11,20 - trione - 21 - al hydrate.

7. A steroid of the formula

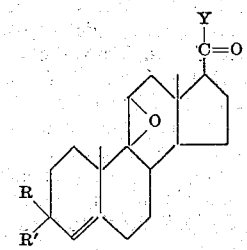

wherein individually R is hydrogen, R' is hydroxy and together R and R' is keto; and Y is selected from the class consisting of

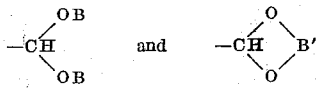

wherein B is a radical of the class consisting of lower alkyl, halo-substituted lower alkyl, lower alkoxy-alkyl and phenyl(lower alkyl), and B' is a saturated divalent aliphatic radical.

8. $9\alpha$ - fluoro - $\Delta^4$ - pregnene - $11\beta$ - ol - 3,20 - dione-21-al 21-di(lower alkyl) acetal.

9. $9\alpha$ - fluoro - $\Delta^4$ - pregnene - $11\beta$ - ol - 3,20 - dione-21-al 21-dimethyl acetal.

10. $9\alpha$ - fluoro - $\Delta^4$ - pregnene - $11\beta$ - ol - 3,20 - dione-21-al hydrate.

11. $9\alpha$ - chloro - $\Delta^4$ - pregnene - $11\beta$ - ol - 3,20 - dione-21-al 21-di(lower alkyl) acetal.

12. $9\alpha$ - chloro - $\Delta^4$ - pregnene - $11\beta$ - ol - 3,20 - dione-21-al 21-dimethyl acetal.

13. $9\alpha$ - chloro - $\Delta^4$ - pregnene - $11\beta$ - ol - 3,20 - dione-21-al hydrate.

14. $9\beta,11\beta$ - oxido - $\Delta^4$ - pregnene - 3,20 - dione - 21-al 21-di(lower alkyl) acetal.

15. $9\beta,11\beta$ - oxido - $\Delta^4$ - pregnene - 3,20 - dione - 21-al 21-dimethyl acetal.

References Cited in the file of this patent

UNITED STATES PATENTS

| | | |
|---|---|---|
| 2,322,809 | Logemann | June 29, 1943 |
| 2,684,376 | Oliveto | July 20, 1954 |
| 2,703,799 | Bergstrom | Mar. 8, 1955 |
| 2,773,077 | Conbere | Dec. 4, 1956 |
| 2,773,078 | Weijlard | Dec. 4, 1956 |

OTHER REFERENCES

Fried et al.: J. Am. Chem. Soc. 75 2273–4 (May 1953).

UNITED STATES PATENT OFFICE
Certificate of Correction

Patent No. 2,859,212　　　　　　　　　　　　　　　　　　　　November 4, 1958

Josef Fried

It is hereby certified that error appears in the printed specification of the above numbered patent requiring correction and that the said Letters Patent should read as corrected below.

Column 6, line 44, for "9β-" read —9α-—; column 7, line 2, for "chlorofrom" read —chloroform—; line 10, for "dimethy" read —dimethyl—; column 8, line 46, for "Claisen-Vigreux" read —Claisen-Vigneux—.

Signed and sealed this 26th day of May 1959.

[SEAL]

Attest:
KARL H. AXLINE,
*Attesting Officer.*

ROBERT C. WATSON,
*Commissioner of Patents.*